(12) United States Patent
Cantwell et al.

(10) Patent No.: US 11,275,817 B2
(45) Date of Patent: Mar. 15, 2022

(54) SYSTEM LOCKDOWN AND DATA PROTECTION

(71) Applicant: Dell Products L.P., Round Rock, TX (US)

(72) Inventors: Thomas Cantwell, Liberty Hill, TX (US); Mark W. Shutt, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 230 days.

(21) Appl. No.: 16/582,788

(22) Filed: Sep. 25, 2019

(65) Prior Publication Data

US 2021/0089633 A1 Mar. 25, 2021

(51) Int. Cl.
| | | |
|---|---|---|
| G06F 21/00 | (2013.01) | |
| G06F 21/12 | (2013.01) | |
| G06F 21/57 | (2013.01) | |
| G06F 11/14 | (2006.01) | |
| G06F 21/74 | (2013.01) | |
| G06F 21/60 | (2013.01) | |

(52) U.S. Cl.
CPC ........ *G06F 21/123* (2013.01); *G06F 11/1441* (2013.01); *G06F 21/575* (2013.01); *G06F 21/602* (2013.01); *G06F 21/74* (2013.01)

(58) Field of Classification Search
CPC .. G06F 21/123; G06F 21/575; G06F 11/1441; G06F 21/74; G06F 21/602; G06F 21/72; G06F 2221/2143
See application file for complete search history.

(56) References Cited

U.S. PATENT DOCUMENTS

| | | | | |
|---|---|---|---|---|
| 6,594,721 | B1 * | 7/2003 | Sakarda | G06F 9/4411 710/302 |
| 7,343,493 | B2 * | 3/2008 | Challener | G06F 21/57 380/44 |
| 2005/0039013 | A1 * | 2/2005 | Bajikar | G06F 21/32 713/172 |
| 2010/0115256 | A1 * | 5/2010 | Challener | G06F 8/66 713/2 |
| 2010/0211717 | A1 * | 8/2010 | Uehara | G06F 9/4411 710/316 |
| 2016/0099969 | A1 * | 4/2016 | Angus | H04L 9/3268 713/158 |
| 2016/0364570 | A1 * | 12/2016 | Stern | G06F 21/575 |
| 2020/0356673 | A1 * | 11/2020 | Xu | H04L 9/3226 |

OTHER PUBLICATIONS

Kamal-Uddin et al., "Microprocessor based relays in controlling and monitoring power system networks", IEE Colloquium on Application of Microprocessors to the Control/Monitoring of Transmission and Distribution Equipment, Date of Conference: 2-2 Jun. (Year: 1989).*

* cited by examiner

*Primary Examiner* — Morshed Mehedi
(74) *Attorney, Agent, or Firm* — Jackson Walker L.L.P.

(57) ABSTRACT

An information handling system may include a processor, and a cryptoprocessor comprising at least one storage location. The information handling system may be configured to: store, in the at least one storage location, cryptographic data regarding secure boot of the information handling system; receive an indication that a lockdown is to be initiated; in response to the indication, overwrite the at least one storage location with invalid data; and initiate the lockdown by triggering a reboot of the information handling system.

20 Claims, 3 Drawing Sheets

SYSTEM LOCKDOWN AND DATA PROTECTION

TECHNICAL FIELD

The present disclosure relates in general to information handling systems, and more particularly to locking down such systems and protecting their data.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Data security is important in information handling systems, which has driven advancements in authentication to access data. Some organizations (e.g., government and military agencies, etc.) require even more stringent security measures and have use cases that are not covered by standard authentication.

One example is a situation in which military personnel may be in a combat scenario that requires them to evacuate their posts immediately, with no time for the user to take actions to protect the data. This leaves information handling systems and their data at risk to be captured by their enemies.

The military has traditionally used several methods to destroy data on a system, including physical damage, manual deletion processes, and removal of physical storage resources. These manual processes are time-consuming, and they grow in complexity with larger deployments, such as server/storage solutions in the field. Each of these processes adds risk in terms of both data breach and the lives of the military personnel trying to secure the data. As another example, a virus attack on a server or datacenter might require an immediate lockdown of one or more information handling systems to prevent further damage or loss of data.

Thus there is a need for a simple and quick method for locking down information handling systems and their data, and in some cases, for destroying their data.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with locking down information handling systems and protecting their data.

In accordance with embodiments of the present disclosure, an information handling system may include a processor, and a cryptoprocessor comprising at least one storage location. The information handling system may be configured to: store, in the at least one storage location, cryptographic data regarding secure boot of the information handling system; receive an indication that a lockdown is to be initiated; in response to the indication, overwrite the at least one storage location with invalid data; and initiate the lockdown by triggering a reboot of the information handling system.

In accordance with these and other embodiments of the present disclosure, a method may include: an information handling system comprising a cryptoprocessor storing, in at least one storage location of the cryptoprocessor, cryptographic data regarding secure boot of the information handling system; the information handling system receiving an indication that a lockdown is to be initiated; in response to the indication, the information handling system overwriting the at least one storage location with invalid data; and the information handling system initiating the lockdown by triggering a reboot of the information handling system.

In accordance with these and other embodiments of the present disclosure, an article of manufacture may include a non-transitory, computer-readable medium having computer-executable code thereon that is executable by a processor of an information handling system for: storing, in at least one storage location of a cryptoprocessor of the information handling system, cryptographic data regarding secure boot of the information handling system; receiving an indication that a lockdown is to be initiated; in response to the indication, overwriting the at least one storage location with invalid data; and initiating the lockdown by triggering a reboot of the information handling system.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
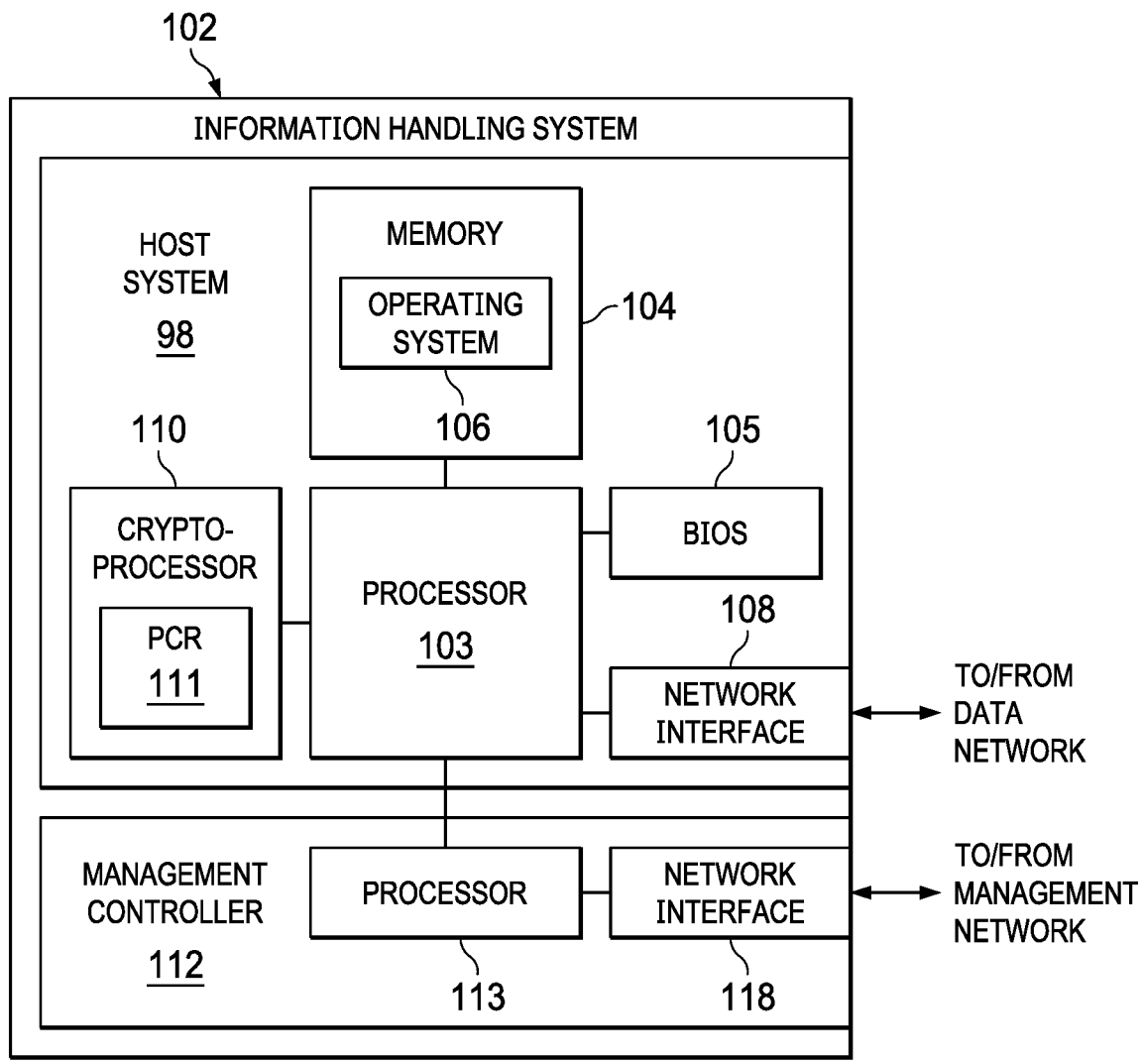
FIG. 1 illustrates a block diagram of an example information handling system, in accordance with embodiments of the present disclosure.
Figure 2:
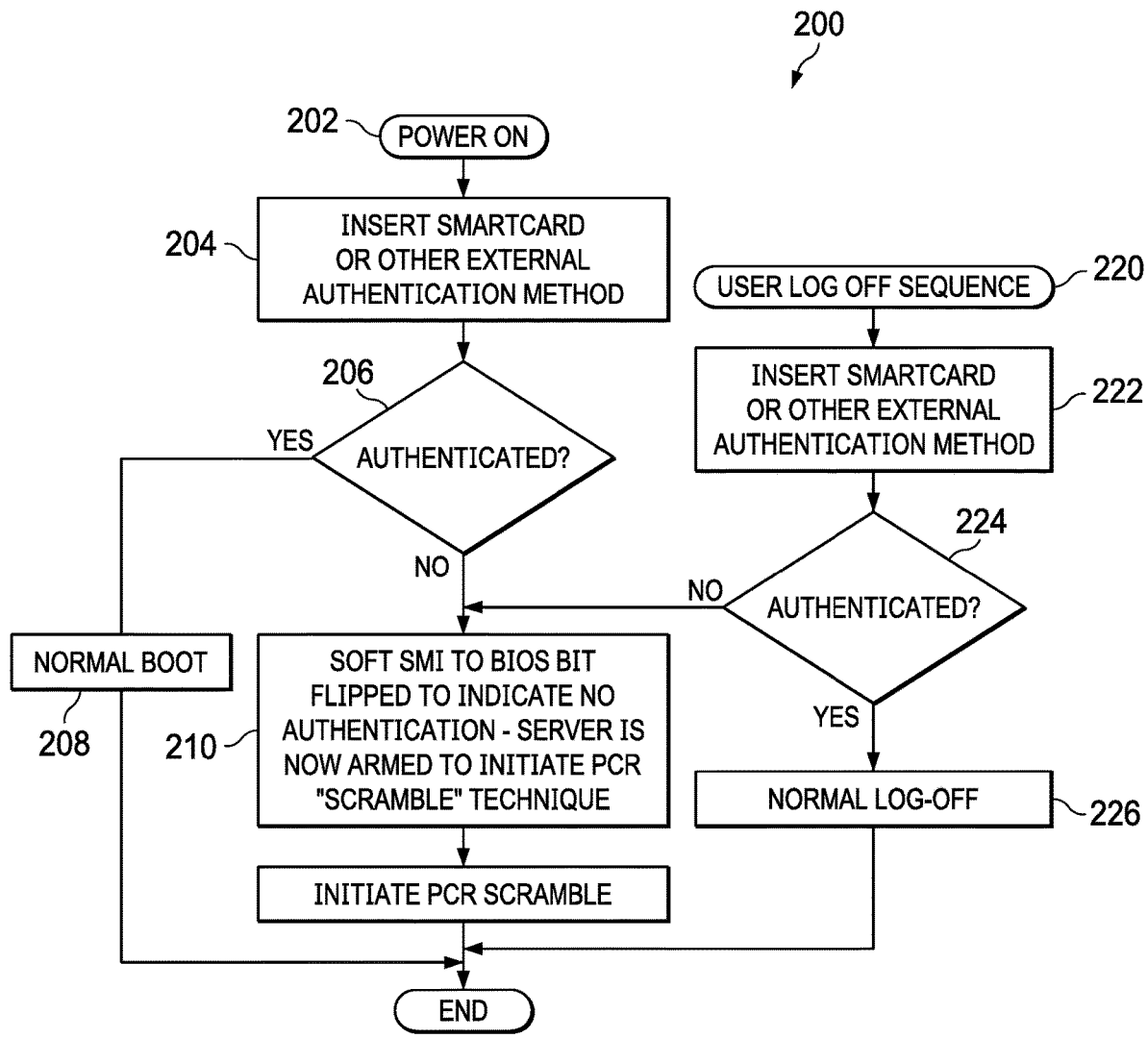
FIG. 2 illustrates an example flow diagram of a method in accordance with embodiments of the present disclosure.
Figure 3:
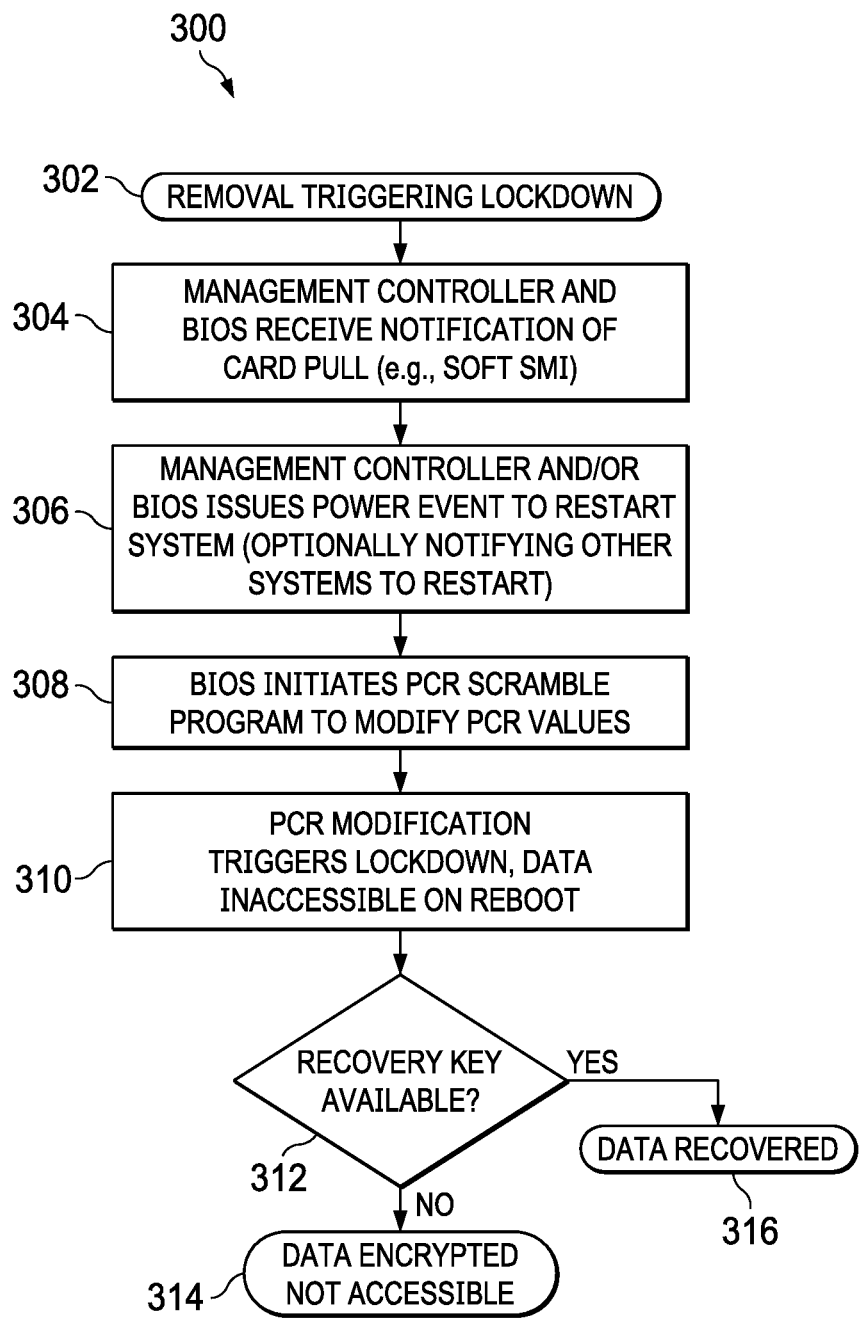
FIG. 3 illustrates an example flow diagram of a method in accordance with embodiments of the present disclosure.

Preferred embodiments and their advantages are best understood by reference to FIGS. 1 through 3, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system (OS) 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

Information handling system 102 may further include a cryptoprocessor 110. In some embodiments, cryptoprocessor 110 may be a processor that is compliant with the Trusted Platform Module (TPM) specification (e.g., TPM 2.0), a successor specification, and/or any other similar specification. Cryptoprocessor 110 may be communicatively coupled to processor 103 (e.g., via an Inter-Integrated Circuit or "I2C" bus or any other suitable bus). In some embodiments, cryptoprocessor 110 may be configured to generate and maintain random numbers, generate and maintain encryption keys, generate and maintain hash key tables of hardware and software components associated with information handling system 102, generate and maintain configuration parameters associated with hardware and software components of information handling system 102, and/or perform any other cryptographic processing.

In some embodiments, cryptoprocessor 110 may include storage locations (e.g., registers such as platform configuration registers (PCRs) capable of storing cryptographic data usable by a secure boot process of information handling system 102. In the embodiment of FIG. 1, such storage locations are shown as PCR 111.

For example, data in PCR 111 may be used for verification purposes in allowing decryption of encrypted storage resources of information handling system 102 (e.g., storage resources encrypted with BitLocker® or another encryption scheme).

In some embodiments, an encryption scheme may provide integrity protection for a secure boot process by using measurements of such PCRs. Thus any unauthorized firmware, application, or bootloader may be prevented from running and acquiring a decryption key, because the PCR values will not match their expected values.

In particular, PCRs may hold measurements of various aspects of system configuration to ensure that the system hardware, firmware, and/or software has not been tampered with. These PCR values can be used by the operating system in various data encryption scenarios, which may lock down the data on reboot (when PCR values are typically re-measured and populated), if the PCR values have changed. In such situations, a recovery key may be required to access the encrypted data.

Accordingly, embodiments of this disclosure may be operable to initiate a lockdown of an information handling system and its data by intentionally overwriting the PCR values with invalid data (e.g., randomly generated values or other values). For example, as discussed in more detail below, a user may trigger a lockdown via one of several methods, and the system may then overwrite the PCR values and reboot. Upon a subsequent boot, the PCR values may be measured and found to be incorrect. Thus the decryption keys will not be released, and the data stored in the system will remain secure.

Turning now to FIG. 2, an example flow diagram of a method 200 is shown. At step 202, an information handling system is powered on. At step 204, a user inserts an authentication information handling resource such as a smartcard in order to log in. In other embodiments, different types of authentication information handling resources may be used, such as a fob or other proximity device, etc.

If the user's smartcard is authenticated at step 206, a normal boot and login procedure is carried out at step 208, and the method ends.

If, on the other hand, the user is not authenticated, the method may proceed to step 210. At step 210, an interrupt (e.g., a system management interrupt (SMI) such as a soft SMI) may be triggered. An indication may be stored, for example by setting a flag bit, to indicate that authentication has failed. This indication may be used to trigger a lockdown procedure.

In some embodiments, the lockdown procedure may "scramble" the PCR data present in a cryptoprocessor of the information handling system. The lockdown procedure may also initiate a reboot of the information handling system. When the information handling system reboots, the scrambled PCR data may prevent access to encrypted data in one or more storage resources of the system.

The lockdown procedure may, in various embodiments, include overwriting one or more PCR registers and then rebooting. In other embodiments, the lockdown procedure may include rebooting, and then (e.g., based on a flag bit being set) overwriting the one or more PCR registers.

In general, any suitable storage location of the cryptoprocessor that is operable to store data for secure boot and/or data encryption purposes may be used for the lockdown procedures discussed herein. Such storage location may be internal to the cryptoprocessor, or it may be external. In some embodiments (e.g., embodiments using a TPM-type cryptoprocessor), one or more of the PCRs such as PCRs 0-7 may be used.

Method 200 further includes steps for secure log-off procedure. At step 220, a user log-off sequence begins. At step 222, the user may (for example, in response to a request from the information handling system) insert a smartcard or other authentication information handling resource.

If the smartcard is authenticated at step 224, a normal log-off may proceed at step 226, and the method may end.

If, on the other hand, authentication fails, then the method may proceed to step 210, and a lockdown may ensue.

In other embodiments, rather than re-inserting the smartcard to logoff, the user may leave the smartcard inserted for the duration of the login session. In these and other embodiments, step 210 may be initiated by an unexpected removal of the smartcard. For example, a normal log-off procedure may include the user inputting some credentials prior to removal of the smartcard. Thus, an unexpected removal of the smartcard (e.g., a removal that is not accompanied by inputting such credentials) may trigger the lockdown.

In yet other embodiments, a lockdown may be initiated by other means besides the use of a smartcard. For example, a lockdown command or function may be invoked by a user. In other embodiments, a specific keypress or combination of keypresses may initiate the lockdown. In yet other embodiments, different trigger events may occur.

Turning now to FIG. 3, an example flow diagram of a method 300 is shown. Method 300 may be used to trigger a lockdown of an information handling system, for example, when a logged-in user is under duress.

At step 302, a triggering event for a lockdown may occur as discussed above. For example, an unexpected smartcard removal may occur, and an SMI may be triggered.

At step 304, the BIOS of the information handling system as well as a management controller may receive notification of the triggering event. At step 306, a power event may be issued to cause the information handling system to reboot. In some embodiments, the management controller may notify additional information handling systems (e.g., related systems on the same management network) that they should also initiate a lockdown. For example, the management controller may be a chassis management controller that initiates a lockdown for all systems within its chassis. In other embodiments, the management controller may communicate with other management controllers of other designated systems to indicate that they should initiate a lockdown.

At step 308, the BIOS of the information handling system initiates a PCR scramble, overwriting the data in one or more PCRs with invalid data.

At step 310, when the information handling system has rebooted, the invalid data stored in the PCRs renders any encrypted data inaccessible.

At step 312, the system waits for a user to input a recovery key. If no such key is input, the data remains encrypted and inaccessible at step 314, and the method ends. If, however, a recovery key is used, then the cryptoprocessor of the information handling system may allow for data recovery at step 316.

One of ordinary skill in the art with the benefit of this disclosure will understand that the preferred initialization point for the methods depicted in FIGS. 2-3 and the order of the steps comprising those methods may depend on the implementation chosen. In these and other embodiments, such methods may be implemented as hardware, firmware, software, applications, functions, libraries, or other instructions. Further, although FIGS. 2-3 disclose a particular number of steps to be taken with respect to the disclosed methods, the methods may be executed with greater or fewer steps than those depicted. The methods may be implemented using any of the various components disclosed herein (such as the components of FIG. 1), and/or any other system operable to implement the methods.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   a processor; and
   a cryptoprocessor comprising at least one storage location;
   wherein the information handling system is configured to:
      store, in the at least one storage location, cryptographic data regarding secure boot of the information handling system;
      receive an indication that a lockdown is to be initiated;
      in response to the indication, overwrite the at least one storage location with invalid data; and
      initiate the lockdown by triggering a reboot of the information handling system.

2. The information handling system of claim 1, wherein the cryptoprocessor is a cryptoprocessor that is compliant with a Trusted Platform Module (TPM) specification.

3. The information handling system of claim 2, wherein the TPM specification is TPM 2.0.

4. The information handling system of claim 2, wherein the at least one storage location comprises at least one register of the cryptoprocessor.

5. The information handling system of claim 4, wherein the at least one register comprises a plurality of Platform Configuration Registers (PCRs).

6. The information handling system of claim 1, wherein the indication comprises an unexpected removal of an authentication information handling resource from the information handling system.

7. The information handling system of claim 6, wherein the authentication information handling resource is a smartcard.

8. The information handling system of claim 1, wherein the reboot is triggered via a management controller of the information handling system.

9. A method comprising:
an information handling system comprising a cryptoprocessor storing, in at least one storage location of the cryptoprocessor, cryptographic data regarding secure boot of the information handling system;
the information handling system receiving an indication that a lockdown is to be initiated;
in response to the indication, the information handling system overwriting the at least one storage location with invalid data; and
the information handling system initiating the lockdown by triggering a reboot of the information handling system.

10. The method of claim 9, further comprising the information handling system removing the lockdown in response to receiving a recovery code.

11. The method of claim 9, wherein the method further includes triggering a system management interrupt (SMI) in response to the indication.

12. The method of claim 9, wherein the invalid data comprises random data.

13. An article of manufacture comprising a non-transitory, computer-readable medium having computer-executable code thereon that is executable by a processor of an information handling system for:
storing, in at least one storage location of a cryptoprocessor of the information handling system, cryptographic data regarding secure boot of the information handling system;
receiving an indication that a lockdown is to be initiated;
in response to the indication, overwriting the at least one storage location with invalid data; and
initiating the lockdown by triggering a reboot of the information handling system.

14. The article of claim 13, wherein the cryptoprocessor is a cryptoprocessor that is compliant with a Trusted Platform Module (TPM) specification.

15. The article of claim 14, wherein the TPM specification is TPM 2.0.

16. The article of claim 14, wherein the at least one storage location comprises at least one register of the cryptoprocessor.

17. The article of claim 16, wherein the at least one register comprises a plurality of Platform Configuration Registers (PCRs).

18. The article of claim 13, wherein the indication comprises an unexpected removal of an authentication information handling resource from the information handling system.

19. The article of claim 18, wherein the authentication information handling resource is a smartcard.

20. The article of claim 13, wherein the reboot is triggered via a management controller of the information handling system.

* * * * *